No. 878,120. PATENTED FEB. 4, 1908.
T. CLISH.
FOLDABLE FEED BAG.
APPLICATION FILED MAY 14, 1907.
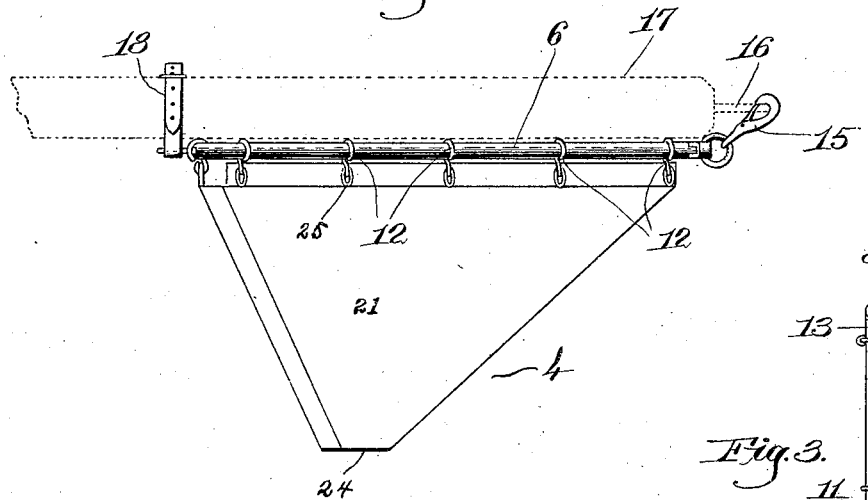
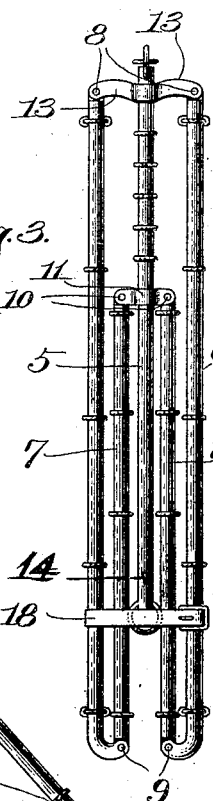
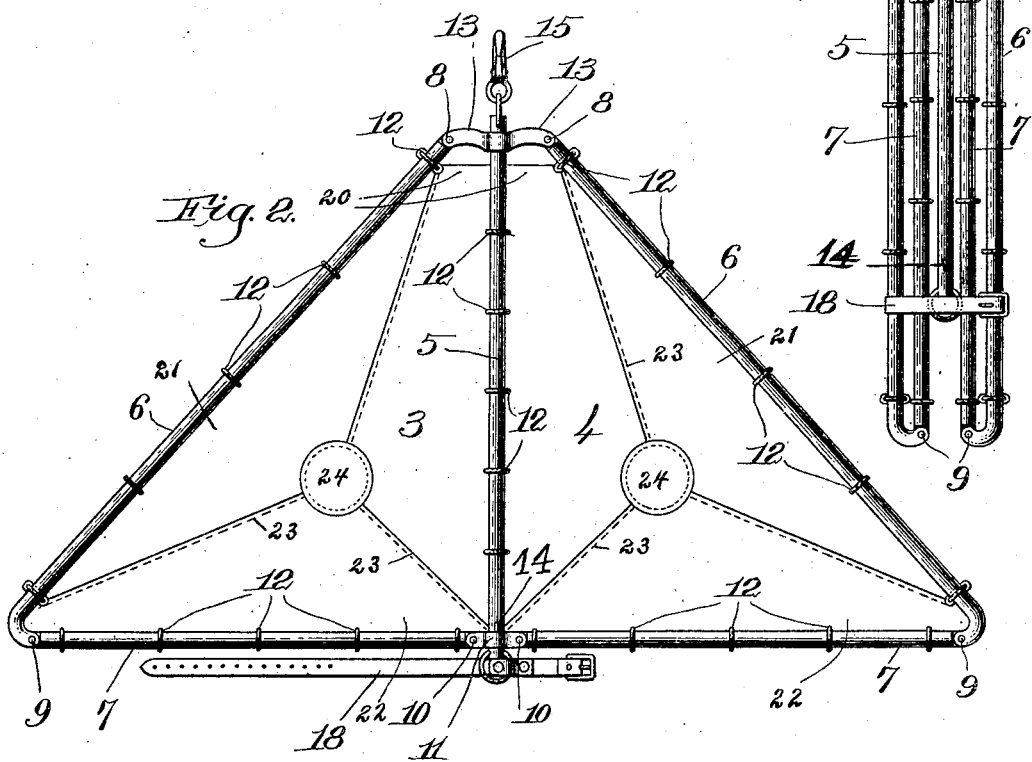
Witnesses:
Thomas J. Drummond
Joseph M. Ward
Inventor.
Thomas Clish,
by Crosby & Gregory
Attys.

UNITED STATES PATENT OFFICE.

THOMAS CLISH, OF LYNN, MASSACHUSETTS.

FOLDABLE FEED-BAG.

No. 878,120.  Specification of Letters Patent.  Patented Feb. 4, 1908.

Application filed May 14, 1907. Serial No. 373,580.

*To all whom it may concern:*

Be it known that I, THOMAS CLISH, a citizen of the United States, residing in Lynn, county of Essex, and State of Massachusetts, have invented an Improvement in Foldable Feed-Bags, of which the following description, in connection with the accompanying drawing, is a specification, like letters on the drawing representing like parts.

This invention relates to feed bags for horses, and especially to that type of bag which is adapted to be sustained by the pole or shafts of a wagon instead of from the head of the horse.

The object of the invention is to provide a novel foldable frame for the feed bag all as will be more fully hereinafter described.

I will first describe one embodiment of my invention and then point out the novel features thereof in the appended claims.

In the drawings, Figure 1 is a side view of the feed bag embodying my invention, showing the manner of securing it to a pole of the wagon; Fig. 2 is a plan view showing the feed bag opened out ready for use, and Fig. 3 shows the bag folded.

The feed bag herein shown is a double bag adapted for a two-horse team, but my invention might be embodied in a single bag adapted for a single horse.

In the present embodiment of my invention, the two feed-receiving compartments or receptacles of the bag are designated 3 and 4, and these may be made of canvas or any other suitable flexible material.

Each compartment is herein shown as having triangular sides 20, 21, 22 united along their downwardly converging edges at 23 by stitching or other suitable fastenings, with a small circular bottom piece 24, each compartment presenting a triangular open top when in use. The adjacent sides 20 of the two compartments 3 and 4 are connected at their upper edges, preferably by making the two adjacent sides from one piece of canvas, and eyelets 25, Fig. 1, are arranged at intervals along the upper edges of the compartments, by which they are supported when in use. Herein I have shown the compartments supported upon a framework which, in this embodiment, comprises a central member 5 and the two side members 6 and 7 on each side thereof. Each side member 6 is pivoted to the central member 5 as at 8, and is also pivoted to the end member 7 as at 9, and each member 7 is pivoted at 10 to a collar 11 which is slidably mounted on the central member 5.

The upper edges of the feed-receiving receptacles are secured to the members 5, 6 and 7, and said receptacles hang below said members, as indicated in Fig. 1. To permit the feeding bag to be folded, the upper edges of the feed-receiving receptacles are slidably mounted on the portions of the frame, and to this end the upper edges of the material forming the feed-receiving receptacles are secured to rings 12 which are passed through the eyelets 25 and slidably mounted on the members of the frame. By making the collar 11 slidable on the central member 5, the bag may be folded from its open position shown in Fig. 2, to its closed position, shown in Fig. 3, by merely sliding the collar toward the front of the member 5. The front ends of the members 6 are shown as pivoted to arms 13 extending from the central member 5 so as to permit the device to be folded without being cramped.

14 is a spring catch of any suitable or usual construction, which is adapted to engage the collar to retain the frame in its open position, but by depressing said catch by means of the finger or thumb, the collar 11 may be slid forward on the central member 5 to permit the device to be folded.

For supporting the feed bag while the horses are feeding therefrom, I use a hook 15 or other equivalent fastening means at the front of the member 5, which hook can be snapped into the ring 16 on the pole 17 of the wagon to which the horses are hitched, and a strap 18 secured to the rear end of the member 5 which strap can be strapped about the pole, as shown in Fig. 1. By this construction the feed bag with its two feed-receiving compartments may be secured directly to the pole of the wagon to which the horses are hitched and in position for the horses to conveniently feed therefrom.

My invention may be embodied in a device adapted for use for a single horse, by merely omitting one-half of the construction, as will be obvious.

Having described my invention what I claim as new and desire to secure by Letters Patent is:—

1. A frame for a feed bag comprising a central member, a side member hinged thereto at one end, and an end member pivoted to the opposite end of the side member and having a sliding engagement with the central member.

2. In a feed bag, a frame having a central member, a side member pivoted thereto at one end and an end member pivoted to the side member and having sliding engagement with the central member, in combination with a feed receptacle supported by said frame.

3. A feed bag comprising a foldable frame having a central member, two side members pivoted thereto, and two end members pivoted to the side members and having sliding engagement with the central member, and feed-receiving receptacles supported by said frame.

4. A frame for a feed bag comprising a central member, two side members pivoted thereto and two end members pivoted to the side members and having sliding engagement with the central member.

5. A feed bag of flexible material presenting two compartments, each compartment having triangular sides united along their downwardly converging edges and presenting a triangular open top, the adjacent sides of the two compartments being connected at their upper edges, and eyelets arranged at intervals along the upper edges of said compartments by which they are supported when in use.

6. The combination with a frame having a central member and two side members on each side of the central member, said central member and each pair of side members inclosing a triangular space, of a feed bag shaped to present two compartments each having triangular downwardly-converging sides and presenting a triangular open top, the adjacent sides of the two compartments being connected at their upper edge, means to connect said upper edge to the central member of the frame, and means to connect the other edges of the compartments to the side members of the frame.

In testimony whereof, I have signed my name to this specification, in the presence of two subscribing witnesses.

THOS. CLISH.

Witnesses:
    LOUIS C. SMITH,
    JOHN C. EDWARDS.